United States Patent
Katkar et al.

(10) Patent No.: US 8,060,773 B1
(45) Date of Patent: Nov. 15, 2011

(54) SYSTEMS AND METHODS FOR MANAGING SUB-CLUSTERS WITHIN A MULTI-CLUSTER COMPUTING SYSTEM SUBSEQUENT TO A NETWORK-PARTITION EVENT

(75) Inventors: Amol Katkar, Maharashtra (IN); Viraj Kamat, Pune (IN); Shailesh Marathe, Pune (IN)

(73) Assignee: Symantec Corporation, Mountain View, CA (US)

( * ) Notice: Subject to any disclaimer, the term of this patent is extended or adjusted under 35 U.S.C. 154(b) by 71 days.

(21) Appl. No.: 12/639,234

(22) Filed: Dec. 16, 2009

(51) Int. Cl.
    *G06F 11/00* (2006.01)
(52) U.S. Cl. .......................................... 714/4.1
(58) Field of Classification Search ........... 714/4.1, 714/4.11, 4.2, 4.21, 4.3, 4.5, 5.11, 6.3, 6.31, 714/32, 43, 56
See application file for complete search history.

(56) References Cited

U.S. PATENT DOCUMENTS

| | | | |
|---|---|---|---|
| 6,363,495 B1 * | 3/2002 | MacKenzie et al. | 714/4.5 |
| 6,393,485 B1 * | 5/2002 | Chao et al. | 709/231 |
| 6,438,705 B1 * | 8/2002 | Chao et al. | 714/4.11 |
| 6,877,107 B2 * | 4/2005 | Giotta et al. | 714/4.3 |
| 7,302,607 B2 * | 11/2007 | Gunda et al. | 714/10 |
| 7,464,378 B1 * | 12/2008 | Limaye et al. | 718/100 |
| 7,627,779 B2 * | 12/2009 | Fair | 714/11 |
| 7,734,947 B1 * | 6/2010 | Frangioso et al. | 714/4.1 |
| 2002/0152414 A1 * | 10/2002 | Barron et al. | 714/4 |
| 2005/0262382 A1 * | 11/2005 | Bain | 714/4 |
| 2006/0259906 A1 * | 11/2006 | Czajkowski et al. | 718/104 |
| 2008/0320113 A1 * | 12/2008 | Arendt et al. | 709/220 |

* cited by examiner

*Primary Examiner* — Nadeem Iqbal
(74) *Attorney, Agent, or Firm* — Advantedge Law Group (57) ABSTRACT

A computer-implemented method for managing sub-clusters within a multi-cluster computing system subsequent to a network-partition event may include: 1) identifying a plurality of computer clusters, 2) identifying a network-partition event that partitions each of the plurality of computer clusters into multiple sub-clusters, 3) identifying, within the multiple sub-clusters, a plurality of nodes that share a common attribute or property, and then 4) ensuring that only those nodes that share the common attribute survive subsequent to the network-partition event. Various other methods, systems, and computer-readable media are also disclosed.

20 Claims, 5 Drawing Sheets

SYSTEMS AND METHODS FOR MANAGING SUB-CLUSTERS WITHIN A MULTI-CLUSTER COMPUTING SYSTEM SUBSEQUENT TO A NETWORK-PARTITION EVENT

BACKGROUND

Computer clusters typically include multiple nodes that collectively perform one or more computing tasks. Occasionally, a network-partition event (such as a device or communication-infrastructure failure) may impair communication within a computer cluster, effectively partitioning the computer cluster into multiple sub-clusters (e.g., groups of one or more nodes) that are unable to communicate with each other. Due to the network-partition event, these isolated sub-clusters may be unable to coordinate operations, such as writing data to and/or reading data from shared resources. In order to avoid overwriting and/or corrupting data related to these tasks, system administrators may seek to ensure that only one sub-cluster performs such tasks after a network-partition event occurs.

Multi-cluster computing systems may include various computer clusters that operate independently of each other. When a network-partition event affects computer clusters on a multi-cluster system, the coordination point may allow a single sub-cluster within each computer cluster to perform computing tasks. However, such computer clusters often incorporate sub-clusters that are located at different sites. As a result, traditional multi-cluster systems may sacrifice efficiency and performance by allowing sub-clusters at different sites to perform computing tasks on behalf of the computer clusters. Accordingly, the instant disclosure identifies a need for efficiently and effectively managing sub-clusters within multiple computer clusters subsequent to a network-partition event.

SUMMARY

As will be described in greater detail below, the instant disclosure generally relates to systems and methods for managing sub-clusters within a multi-cluster computing system subsequent to a network-partition event. In particular, the systems and methods disclosed herein may provide an arbitration technique for efficiently and effectively managing sub-clusters within multiple computer clusters by ensuring that only nodes that share a common attribute (such as the same physical or virtual location and/or hosted application) perform computing tasks on behalf of a particular cluster subsequent to a network-partition event.

For example, a method for managing sub-clusters within a multi-cluster computing system subsequent to a network-partition event may include: 1) identifying a plurality of computer clusters, 2) identifying a network-partition event that partitions each of the plurality of computer clusters into multiple sub-clusters, 3) identifying, within the multiple sub-clusters, a plurality of nodes that share a common attribute or property (such as the same physical or virtual location and/or hosted application), and then 4) ensuring that only those nodes that share the common attribute survive subsequent to the network-partition event. In some embodiments, the plurality of computer clusters may include a plurality of physical machines and/or a plurality of virtual machines that are programmed to execute on at least one physical machine.

In at least one embodiment, the network-partition event may represent a communication failure that prevents sub-clusters within each of the computer clusters from communicating with one another. The communication failure may result from a node failure and/or a communication-infrastructure failure. For example, the communication infrastructure of the computer clusters may be damaged during a construction accident, effectively partitioning each of the computer clusters into sub-clusters that are unable to communicate with one another.

In some embodiments, the nodes within the multiple sub-clusters may attempt to contact a coordination point (e.g., a server) subsequent to the network-partition event in an attempt to secure access to one or more shared resources (e.g., storage devices). In this example, the coordination point may identify nodes that share the common attribute by: 1) identifying the first node to contact the coordination point subsequent to the network-partition event, 2) identifying at least one attribute of this first node (e.g., the coordination point may identify a building in which the first node is located, a physical machine on which the first node is programmed to execute as a virtual machine, and/or an application or set of applications hosted by the first node), and then 3) identifying at least one additional node that possesses the attribute of the first node. For example, the coordination point may identify at least one additional node that is located in the same building or physical machine as the first node and/or at least one additional node that hosts the same application or applications as the first node. In other words, the coordination point may choose the common attribute (e.g., a physical or virtual location) based on attributes possessed by the first node to contact the coordination point subsequent to the network-partition event.

In some examples, the first node to contact the coordination point subsequent to the network-partition event may represent a proxy node that is configured to contact the coordination point on behalf of all other nodes that share the common attribute. For example, a proxy node may be configured to contact the coordination point on behalf of all other nodes that are located in the same building. In other examples, the proxy node may represent a virtual machine that is configured to contact the coordination point on behalf of all other virtual machines that are programmed to execute on the same physical machine.

In some embodiments, the systems described herein may configure nodes that lack a preferred attribute to refrain from contacting the coordination point altogether or until completion of a pre-defined delay period. For example, a node that is located in a less-preferred physical or virtual location may be configured to refrain from contacting the coordination point or to wait ten seconds before attempting to contact the coordination point subsequent to the network-partition event. Similarly, a node that hosts non-critical applications may be configured to refrain from contacting the coordination point or to wait ten seconds before attempting to contact the coordination point subsequent to the network-partition event.

In some examples, the coordination point may ensure that only those nodes that share the common attribute survive by allowing only those nodes that share the common attribute to perform computing tasks on behalf of the plurality of computer clusters subsequent to the network-partition event. In other words, the coordination point may allow nodes that share the common attribute to perform computing tasks on behalf of the cluster while preventing nodes that lack the common attribute from performing computing tasks on behalf of the cluster. For example, the coordination point may allow all nodes that are located in a particular building to perform computing tasks but may shut down all other nodes that are located in different buildings. Similarly, the coordination point may allow nodes that are programmed to execute as virtual machines on a particular physical machine to perform tasks but may shut down all other nodes that are programmed to execute as virtual machines on different physical machines. The coordination point may also allow nodes that host specific critical applications to perform tasks but may shut down all other nodes that host non-critical applications.

As will be described in greater detail below, by only allowing nodes that share a common attribute to survive subsequent to a network-partition event, the various systems and methods described herein may enable a coordination point to efficiently and effectively manage sub-clusters within multiple computer clusters. As a result, the systems and methods described herein may increase stability and preserve resources within a multi-cluster computing system. These and additional embodiments may also provide various other features and advantages.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing sub-clusters within a multi-cluster computing system subsequent to a network-partition event. More specifically, the systems and methods disclosed herein may provide an arbitration technique for efficiently and effectively managing sub-clusters within multiple computer clusters by ensuring that only nodes that share a common attribute perform computing tasks on behalf of a computing cluster subsequent to a network-partition event.

The phrase "computer cluster," as used herein, generally refers to a group of two or more nodes (e.g., two or more computing devices) that are capable of communicating with one another via a network. Computer clusters may also incorporate shared resources, such as storage devices, and may be programmed to perform one or more tasks. Examples of computer clusters include, without limitation, high-availability clusters, load-balancing clusters, compute clusters, Beowolf clusters, high-performance computing clusters, or any other suitable computer clusters.

Similarly, the term "sub-cluster," as used herein, generally refers to one or more nodes that have been partitioned by a network-partition event within a computer cluster. In other words, a network-partition event may partition a computer cluster into multiple sub-clusters (i.e., groups of one or more nodes) that are unable to communicate with one another. However, while such sub-clusters may be unable to communicate with one another, nodes within a single sub-cluster may still be capable of communicating with one another.

The term "node," as used herein, generally refers to any type or form of computing device that is capable of reading computer-executable instructions and communicating with other computing devices. Nodes may be programmed to individually perform tasks and/or collectively perform tasks by coordinating operations with additional nodes within a computer cluster. Examples of nodes include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Figure 1:
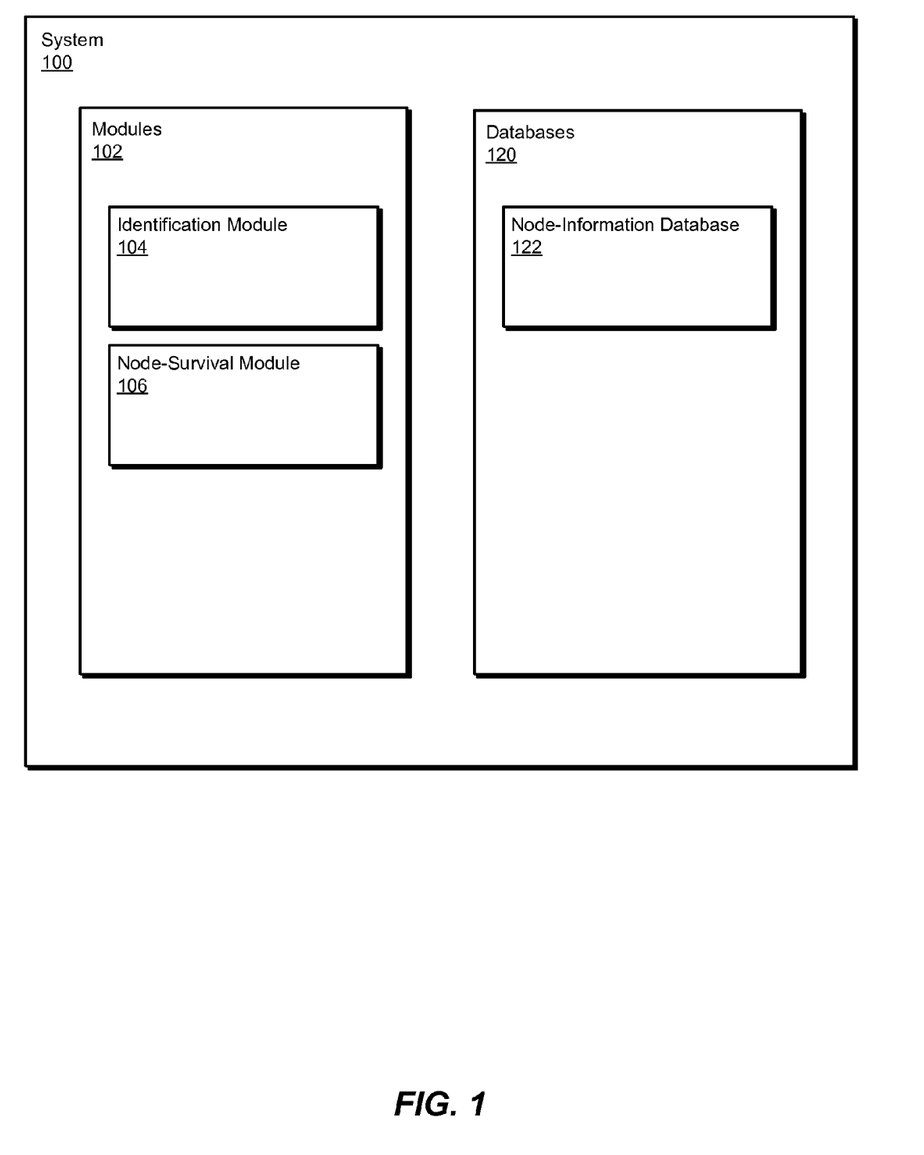
FIG. 1 is a block diagram of an exemplary system for managing sub-clusters within a multi-cluster computing system subsequent to a network-partition event according to at least one embodiment.
Figure 2:
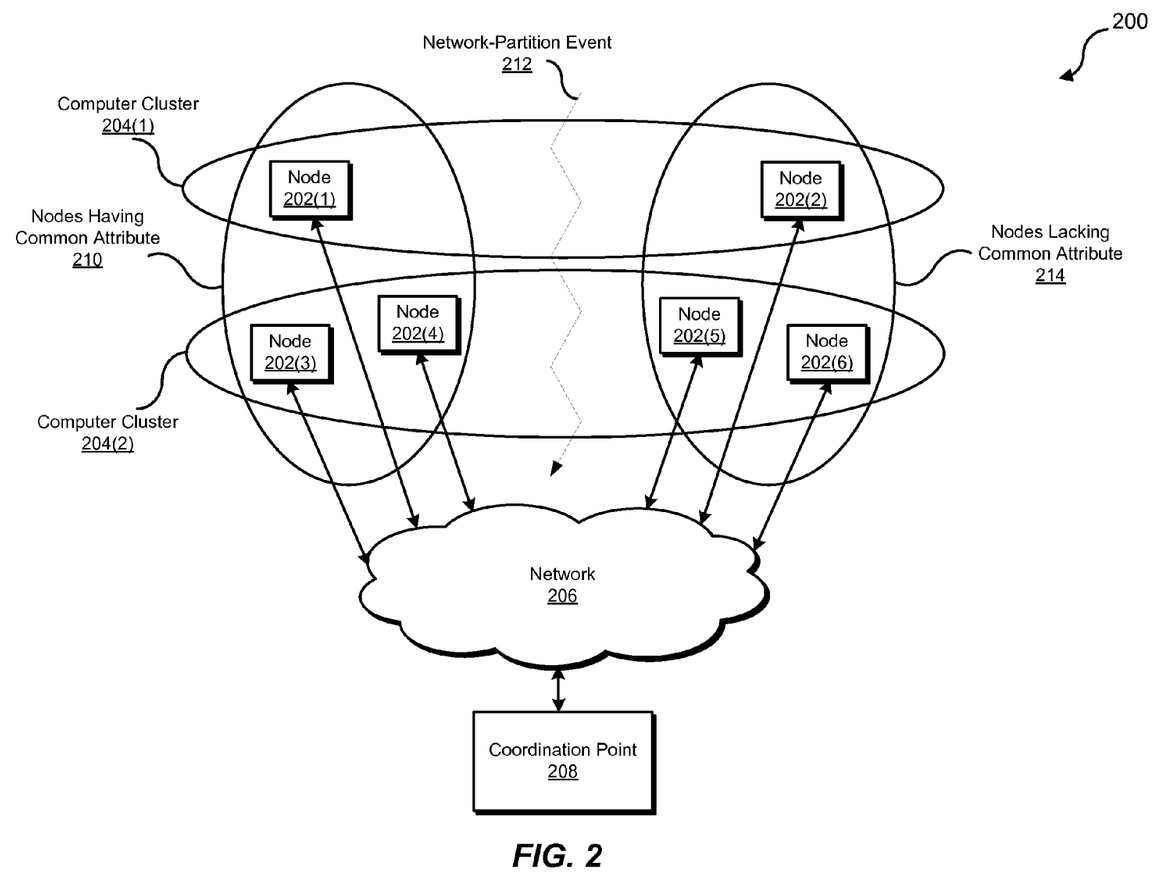
FIG. 2 is a block diagram of an exemplary system for managing sub-clusters within a multi-cluster computing system subsequent to a network-partition event according to at least one embodiment.

The following will provide, with reference to FIGS. 1-2, detailed descriptions of exemplary systems for managing sub-clusters within a multi-cluster computing system subsequent to a network-partition event. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for managing sub-clusters within a multi-cluster computing system subsequent to a network-partition event. As illustrated in this figure, exemplary system 100 may include one or more modules 102 for performing one or more tasks. For example, and as will be explained in greater detail below, exemplary system 100 may include an identification module 104 programmed to identify network-partition events that partition computer clusters into multiple sub-clusters. Identification module 104 may also be programmed to identify nodes within the partitioned sub-clusters that share at least one common attribute.

In addition, and as will be described in greater detail below, exemplary system 100 may include a node-survival module 106 programmed to ensure that only those nodes that share the common attribute survive subsequent to the network-partition event. For example, node-survival module 106 may be programmed to allow those nodes that share the common attribute to perform tasks on behalf of the computer clusters but prevent all other nodes from performing such tasks subsequent to the network-partition event. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., nodes 202(1)-(6) and/or coordination point 208), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, databases 120 may include a node-information database 122 for storing information about each node within a multi-cluster computing system. More specifically, node-information database 122 may include information that identifies a physical location or a virtual location, an identification address (e.g., an IP address or a MAC address), a node registration key, a corresponding computer cluster, and/or a corresponding sub-cluster for each node within a multi-cluster computing system. Node-information database 122 may also include information that identifies one or more applications or application tasks hosted or executed by nodes within a multi-cluster computing system.

Databases 120 in FIG. 1 may represent a portion of one or more computing devices. For example, databases 120 may represent a portion of nodes 202(1)-(6) in FIG. 2, coordination point 208 in FIG. 2, computing system in FIG. 4, and/or portions of exemplary network architecture 500 in FIG. 5. Alternatively, databases 120 in FIG. 1 may represent one or more physically separate devices capable of being accessed by a computing device, such as nodes 202(1)-(6) in FIG. 2, coordination point 208 in FIG. 2, computing system 410 in FIG. 4, and/or portions of exemplary network architecture 500 in FIG. 5.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include computer clusters 204(1)-(2), a network 206, and a coordination point 208. Network 206 may facilitate communication between computer clusters 204(1)-(2) and coordination point 208.

In some embodiments, and as will be described in greater detail below, coordination point 208 may be programmed to identify a network-partition event 212 that partitions each of computer clusters 204(1)-(2) into multiple sub-clusters that are unable to communicate with one another. For example, network-partition event 212 may impair communication between node 202(1) and node 202(2) within computer cluster 204(1), effectively transforming each of nodes 202(1)-(2) into an individual sub-cluster within computer cluster 204(1). In this example, network-partition event 212 may also impair communication between nodes 202(3)-(4) and nodes 202(5)-(6) within computer cluster 204(2), effectively transforming nodes 202(3)-(4) and nodes 202(5)-(6) into first and second sub-clusters, respectively, within computer cluster 204(2). In other words, while nodes 202(3)-(4) may still be capable of communicating with one another subsequent to network-partition event 212, nodes 202(3)-(4) may be unable to communicate with nodes 202(5)-(6).

In the above example, upon identifying network-partition event 212, coordination point 208 may identify nodes that share a common attribute (e.g., nodes 210, comprising nodes 202(1) and 202(3)-(4)). For example, coordination point 208 may determine that nodes 202(1) and 202(3)-(4) are located within the same building or (in the case of virtual machines) within the same physical machine. Coordination point 208 may then ensure that only those nodes that share the common attribute survive subsequent to the network-partition event. For example, coordination point 208 may: 1) instruct those nodes that share the common attribute (e.g., nodes 210) to perform one or more tasks on behalf of computer clusters 204(1)-(2) and 2) instruct nodes that lack the common attribute (e.g., nodes 214, comprising nodes 202(2) and 202 (5)-(6)) to refrain from performing such tasks.

Coordination point 208 generally represents any type or form of computing device that is capable of managing sub-clusters within computer clusters subsequent to a network-partition event. Examples of coordination point 208 include, without limitation, servers, storage devices (such as disks or disk arrays), laptops, desktops, cellular phones, personal digital assistants (PDAs), multimedia players, embedded systems, combinations of one or more of the same, exemplary computing system 410 in FIG. 4, or any other suitable computing device.

Nodes 202(1)-(6) generally represent any type or form of computing device capable of reading computer-executable instructions and communicating with other computer devices. Examples of nodes 202(1)-(6) include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Network 206 generally represents any medium or architecture capable of facilitating communication or data transfer. Examples of network 206 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or any other suitable network. In addition, network 206 may facilitate communication or data transfer using wireless or wired connections.

Network-partition event 212 may include any type or form of communication failure that prevents sub-clusters within a computing cluster from communicating with one another. This communication failure may result from a node failure and/or a communication-infrastructure failure. For example, node 202(2) may suffer one or more hardware or software malfunctions that may prevent node 202(2) from communicating with node 202(1) within computer cluster 204(1). Similarly, the communication infrastructure of computer clusters 204(1)-(2) may be damaged during a construction accident in which one or more communication lines are severed.

Figure 3:
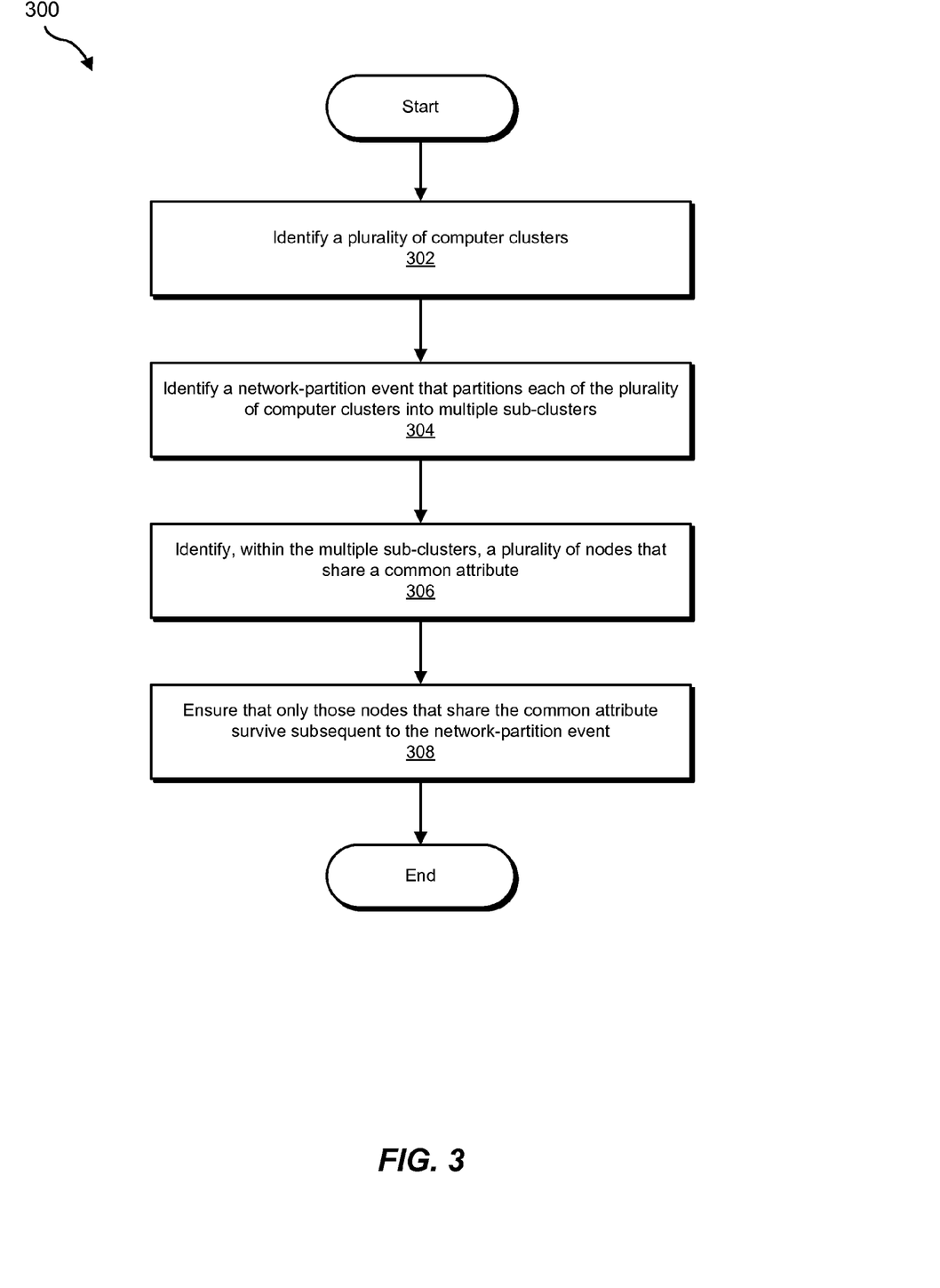
FIG. 3 is a flow diagram of an exemplary method for managing sub-clusters within a multi-cluster computing system subsequent to a network-partition event according to at least one embodiment.

FIG. 3 is a flow diagram of an exemplary computer-implemented method 300 for managing sub-clusters within a multi-cluster computing system subsequent to a network-partition event. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the various systems described herein may identify a plurality of computer clusters. For example, identification module 104 in FIG. 1 may, as part of coordination point 208 in FIG. 2, identify computer clusters 204(1) and 204(2), comprising nodes 202(1)-(2) and nodes 202(3)-(6), respectively.

The nodes identified in step 302 may represent physical machines and/or virtual machines that are programmed to execute on at least one physical machine. For example, nodes 202(1) and 202(3)-(4) may represent virtual machines that are programmed to execute on a first physical machine, while nodes 202(2) and 202(5)-(6) may represent virtual machines that are programmed to execute on a second physical machine. Alternatively, each of nodes 202(1)-(6) may represent a physical machine within computer clusters 204(1) or 204(2).

The various systems described herein may perform step 302 in a variety of ways. In one example, identification module 104 may, as part of coordination point 208 in FIG. 2, identify one or more of nodes 202(1)-(6) upon receiving messages from such nodes subsequent to a network-partition event (such as network-partition 212), as explained in greater detail below.

At step 304, the systems described herein may identify a network-partition event that partitions each of the computer clusters identified in step 302 into multiple sub-clusters. For example, identification module 104 in FIG. 1 may, as part of coordination point 208 in FIG. 2, identify a network-partition event 212 that impairs communication within computer cluster 204(1), effectively transforming nodes 202(1) and 202(2) into first and second sub-clusters, respectively, within computer cluster 204(1). Similarly, identification module 104 may determine that network-partition event 212 has impaired communication within computer cluster 204(2), effectively transforming nodes 202(3)-(4) and nodes 202(5)-(6) into first and second sub-clusters, respectively, within computer cluster 204(2).

The systems described herein may perform step 304 in a variety of ways. In some examples, identification module 104 may identify network-partition event 212 as part of one or more of nodes 202(1)-(6). For example, identification module 104 may, as part of node 202(1), determine that node 202(1) is unable to communicate with node 202(2), effectively identifying network-partition event 212. Additionally or alternatively, identification module 104 may identify network-partition event 212 as part of coordination point 208. For example, identification module 104 may, as part of node 202(1), receive a message from node 202(1) that indicates that node 202(1) is unable to communicate with node 202(2), effectively identifying network-partition event 212. Alternatively, identification module 104 may direct coordination point 208 to monitor communication between nodes 202(1)-(6) in order to detect network-partition events.

As detailed above, network-partition event 212 may include any type or form of communication failure that prevents sub-clusters within a computing cluster from communicating with one another. In the example illustrated in FIG. 2, node 202(1) may be unable to communicate with node 202(2) within computer cluster 204(1) subsequent to network-partition event 212. Similarly, nodes 202(3)-(4) may be unable to communicate with nodes 202(5)-(6) within computer cluster 204(2) subsequent to network-partition event 212. However, as a sub-cluster within computer cluster 204(2), nodes 202(3)-(4) may still be able to communicate with one another subsequent to network-partition event 212.

At step 306, the systems described herein may identify a plurality of nodes within the multiple sub-clusters that share a common attribute. For example, identification module 104 may, as part of coordination point 208 in FIG. 2, determine that nodes 210 (comprising 202(1) and 202(3)-(4)) share a common attribute, such as a common physical or virtual location. For example, identification module 104 may determine that nodes 210 are located in the same building, host the same application, and/or are virtual machines (such as control domains or guest domains) that are programmed to execute on the same physical machine.

As detailed above, the attribute identified in step 306 may represent any type or form of attribute or property. In one example, this attribute may represent the physical location of one or more nodes and/or the physical machine on which one or more virtual nodes execute. In another example, this attribute may represent an application hosted, managed, and/or executed by one or more nodes. This attribute may be preselected (such as by a system administrator of coordination point 208, as explained below) and/or dynamically selected on an ad-hoc basis (by, e.g., selecting an attribute from the winner of a node race conducted in response to a network-partition event and/or by selecting a sub-cluster responsible for hosting all or a majority of various mission-critical applications, as detailed below).

The systems described herein may perform step 306 in a variety of ways. In one example, identification module 104 may access node-information database 122 to identify one or more nodes 202(1)-(6) having attributes that satisfy a predefined policy. For example, a system administrator of coordination point 208 may define a policy that specifies that only nodes that host all or a majority of a specific application or set of applications or are located at a preferred physical or virtual location are to survive subsequent to a network-partition event. In this example, subsequent to the occurrence of network-partition event 212, identification module 104 may, as part of coordination point 208, query node-information database 122 in order to identify the preferred nodes. As detailed above, node-information database 122 (which may, as explained above, be stored on coordination point 208 and/or distributed variously among nodes 202(1)-(6)) may include information that identifies one or more attributes of nodes 202(1)-(6), such as the physical and/or virtual locations of nodes 202(1)-(6) and/or applications hosted, managed, and/or executed by nodes 202(1)-(6).

In an additional example, identification module 104 may directly query one or more of nodes 202(1)-(6) in order to obtain information that identifies attributes of nodes 202(1)-(6). For example, identification module 104 may, as part of coordination point 208, directly query one or more of nodes 202(1)-(6) in order to determine the applications or application tasks currently hosted and/or executed by each node and/or to determine the physical and/or virtual location of each node.

In other examples, identification module 104 may perform step 306 by selecting an attribute from the winner of a node race conducted in response to a network-partition event. For example, nodes 202(1)-(6) may attempt to contact coordination point 208 to secure access to one or more shared resources (e.g., storage devices) subsequent to the occurrence of network-partition event 212. In this example, identification module 104 may, as part of coordination point 208: 1) identify the first node to contact coordination point 208 subsequent to network-partition event 212, 2) identify at least one attribute of this first node, and then 3) identify at least one additional node that possesses the same attribute as the first node. For example, identification module 104 may, as part of coordination point 208 in FIG. 2, receive a message from node 202(1) (such as a message that identifies the occurrence of network-partition event 212) immediately subsequent to network-partition event 212. Upon determining that node 202(1) represents the first node to contact coordination point 208 subsequent to network-partition event 212, identification module 104 may identify at least one attribute of node 202(1).

For example, identification module 104 may access node-information database 122 to locate information that identifies a building in which node 202(1) is located, a physical machine on which node 202(1) is programmed to execute as a virtual machine, and/or one or more applications or application tasks hosted and/or executed by node 202(1). Alternatively, the message received from node 202(1) may include information that identifies one or more properties of node 202(1) (such as the physical and/or virtual location of node 202(1) and/or applications hosted by node 202(1)).

Identification module 104 may then identify at least one additional node that possesses the same attribute as the first node to contact the coordination point subsequent to the network-partition event. For example, identification module 104 may receive subsequent messages from nodes 202(3)-(4) that contain information that identifies nodes 202(3)-(4) as being located within the same building or physical machine (in the case of virtual machines) as node 202(1) and/or are responsible for managing the same applications as node 202(1). Similarly, identification module 104 may, by querying node-information database 122, determine that nodes 202(3)-(4) are located within the same building or physical machine as node 202(1) and/or are responsible for hosting the same applications as node 202(1).

At step 308, the systems described herein may ensure that only those nodes identified in step 306 (i.e., those nodes that share the common attribute) survive subsequent to the network-partition event detected in step 304. For example, node-survival module 106 may, as part of coordination point 208 in FIG. 2, allow nodes 210 (comprising nodes 202(1) and 202 (3)-(4), which may, as detailed above, represent nodes residing within the same building or physical machine and/or responsible for hosting the same applications) to perform one or more tasks on behalf of computer clusters 204(1)-(2).

For example, node-survival module 106 may: 1) direct node 202(1) to perform one or more tasks on behalf of computer cluster 204(1) and 2) direct nodes 202(3)-(4) to perform one or more tasks on behalf of computer cluster 204(2). In contrast, node-survival module 106 may prevent nodes 214 (comprising nodes 202(2) and 202(5)-(6), which may, as detailed above, represent nodes residing at a different building on a different physical machine and/or nodes responsible for hosting different applications) from performing these tasks (by, e.g., disabling or shutting down nodes 214).

The various systems described herein may perform step 308 in a variety of ways. In some examples, node-survival module 106 may, as part of nodes 202(1)-(6), ensure that only those nodes that share the common attribute survive subsequent to network-partition event 212. For example, node-survival module 106 may, as part of nodes 202(1) and 202 (3)-(4), direct nodes 210 to perform one or more tasks subsequent to network-partition event 212. In addition, node-survival module 106 may, as part of nodes 202(2) and 202 (5)-(6), direct nodes 214 to shut down subsequent to network-partition event 212.

Additionally or alternatively, node-survival module 106 may, as part of coordination point 208, send instructions to nodes 202(1) and 202(3)-(4) to perform one or more computing tasks on behalf of computer clusters 204(1) and 204(2) subsequent to network-partition event 212. Node-survival module 106 may also send additional instructions to nodes 202(2) and 202(5)-(6) to cease performing computing tasks on behalf of computer clusters 204(1) and 204(2) subsequent to network-partition event 212. Upon completion of step 308 in FIG. 3, exemplary method 300 may terminate.

In some examples, the first node to contact the coordination point subsequent to the network-partition event may represent a proxy node that is configured to contact the coordination point on behalf of all other nodes that share the common attribute. For example, node 202(1) in FIG. 2 may be configured to contact coordination point 208 on behalf of nodes 202(3)-(4), which may, as detailed above, represent nodes located within the same building or physical machine as node 202(1) and/or nodes that host the same applications as node 202(1). In this example, coordination point 208 may, upon receiving a communication from node 202(1) that identifies node 202(1) as a proxy for nodes 202(3)-(4), instruct nodes 202(1) and 202(3)-(4) to continue performing computing tasks on behalf of computer clusters 204(1) and 204(2) subsequent to network partition 212.

In some embodiments, nodes that lack a preferred attribute may be prevented from contacting the coordination point either altogether or until completion of a pre-defined delay period. For example, node-survival module 106 may be configured to prevent nodes 214 (comprising nodes 202(2) and 202(5)-(6), which may, as detailed above, represent nodes that are located at a less-preferred physical or virtual location, such as a different building or physical machine from nodes 202(1) and 202(3)-(4), and/or nodes that manage non-critical applications) from contacting coordination point 208 until completion of a ten-second delay period. In this example, nodes 202(2) and 202(5)-(6) may refrain from contacting coordination point 208 altogether and/or may only attempt to contact coordination point 208 subsequent to the occurrence of network-partition event 212 upon completion of the ten-second delay period.

As detailed above, by only allowing nodes that share a common attribute to survive subsequent to a network-partition event, the various systems and methods described herein may enable a coordination point to efficiently and effectively manage sub-clusters within multiple computer clusters. As a result, the systems and methods described herein may increase stability and preserve resources within a multi-cluster computing system. These and additional embodiments may also provide various other features and advantages.

Figure 4:
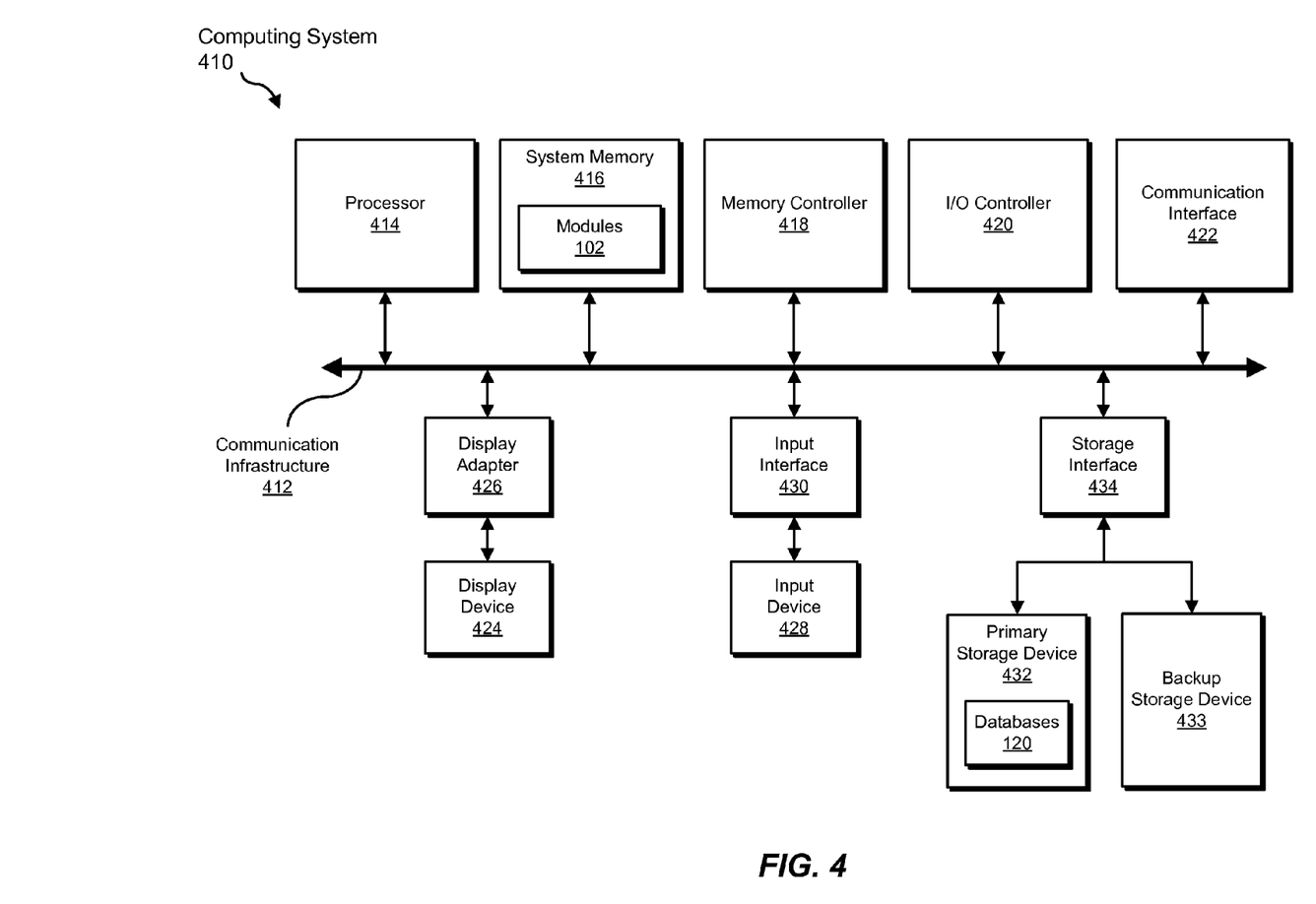
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, ensuring, preventing, and allowing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as identifying, ensuring, preventing, and allowing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the identifying, ensuring, preventing, and allowing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, ensuring, preventing, and allowing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, ensuring, preventing, and allowing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, databases 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the identifying, ensuring, preventing, and allowing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
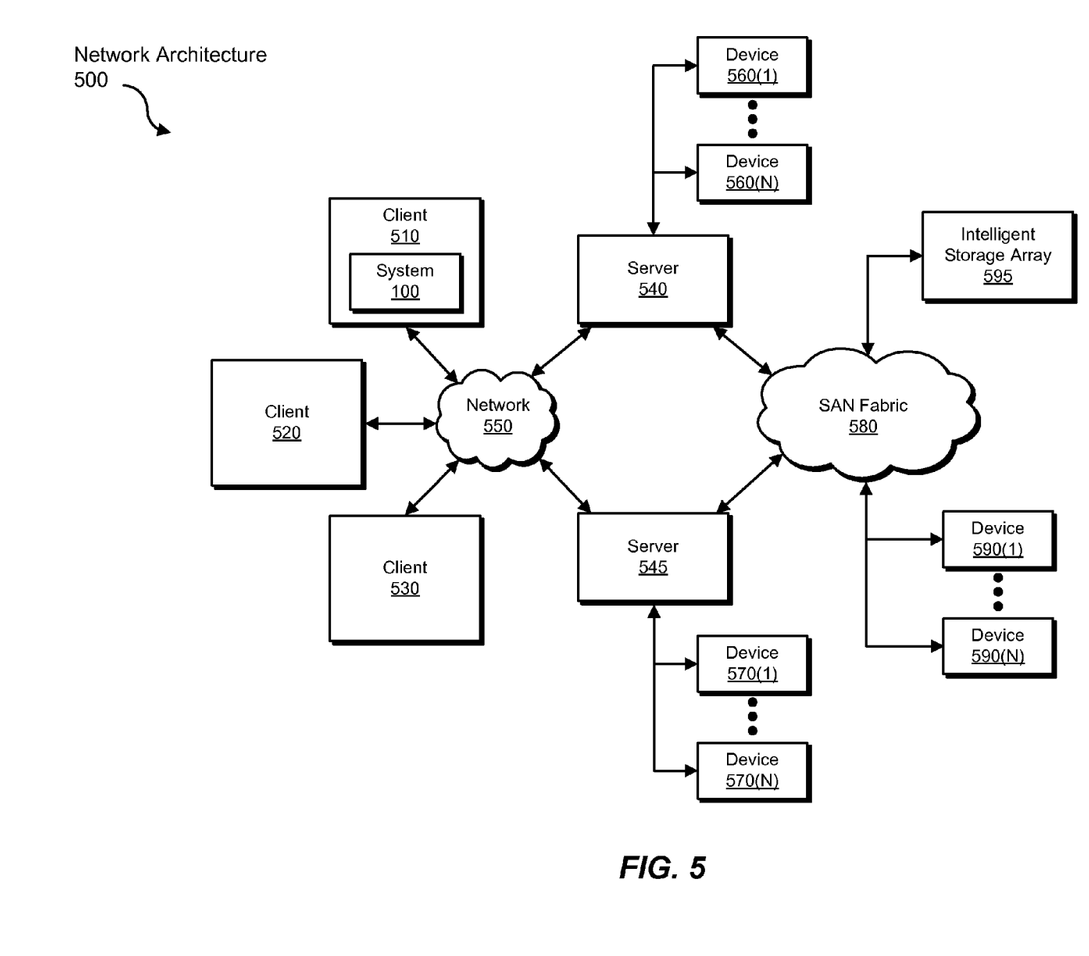
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560 (1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590 (1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the identifying, ensuring, preventing, and allowing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for managing sub-clusters within a multi-cluster computing system subsequent to a network-partition event.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform physical devices and/or representations of physical devices by disabling or shutting down such devices that lack the common attribute.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing sub-clusters within a multi-cluster computing system subsequent to a network-partition event, at least a portion of the method being performed by a computing device comprising at least one processor, the method comprising:
   identifying a multi-cluster computing system comprising a plurality of computer clusters, each of the plurality of computer clusters within the multi-cluster computing system comprising a plurality of nodes;
   identifying a network-partition event that partitions each of the plurality of computer clusters within the multi-cluster computing system into multiple sub-clusters;
   identifying, within the multiple sub-clusters of the plurality of computer clusters, a plurality of nodes that share a common attribute;
   ensuring that only those nodes that share the common attribute survive subsequent to the network-partition event.

2. The method of claim 1, wherein identifying the plurality of nodes that share the common attribute comprises:
   identifying a node that is the first to contact a coordination point subsequent to the network-partition event;
   identifying at least one attribute of the node;
   identifying at least one additional node that possesses the attribute of the node.

3. The method of claim 2, wherein the node that is the first to contact the coordination point subsequent to the network-partition event comprises a proxy node that is configured to contact the coordination point on behalf of all other nodes that share the common attribute.

4. The method of claim 2, further comprising at least one of:
   preventing at least one node that lacks the common attribute from contacting the coordination point;
   preventing at least one node that lacks the common attribute from contacting the coordination point until completion of a pre-defined delay period.

5. The method of claim 1, wherein ensuring that only those nodes that share the common attribute survive comprises:
   allowing those nodes that share the common attribute to perform tasks on behalf of the plurality of computer clusters;
   preventing nodes that lack the common attribute from performing tasks on behalf of the plurality of computer clusters.

6. The method of claim 1, wherein the network-partition event comprises at least one communication failure that prevents sub-clusters within each of the plurality or computer clusters from communicating with one another.

7. The method of claim 6, wherein the communication failure is caused by at least one of:
   a node failure;
   a communication-infrastructure failure.

8. The method of claim 1, wherein each of the plurality of computer clusters comprises at least one of:
   a plurality of virtual machines that are programmed to execute on at least one physical machine;
   a plurality of physical machines.

9. The method of claim 1, wherein the common attribute comprises at least one of:
   a physical location of the nodes;
   a virtual location of the nodes;
   at least one application hosted by the nodes.

10. A system for managing sub-clusters within a multi-cluster computing system subsequent to a network-partition event, the system comprising:
an identification module programmed to:
identify a multi-cluster computing system comprising a plurality of computer clusters, each of the plurality of computer clusters within the multi-cluster computing system comprising a plurality of nodes;
identify a network-partition event that partitions each of the plurality of computer clusters within the multi-cluster computing system into multiple sub-clusters;
identify, within the multiple sub-clusters of the plurality of computer clusters, a plurality of nodes that share a common attribute;
a node-survival module programmed to ensure that only those nodes that share the common attribute survive subsequent to the network-partition event;
at least one processor configured to execute the identification module and the node-survival module.

11. The system of claim 10, wherein the identification module identifies the plurality of nodes that share the common attribute by:
identifying a node that is the first to contact a coordination point subsequent to the network-partition event;
identifying at least one attribute of the node;
identifying at least one additional node that possesses the attribute of the node.

12. The system of claim 11, wherein the node that is the first to contact the coordination point subsequent to the network-partition event comprises a proxy node that is configured to contact the coordination point on behalf of all other nodes that share the common attribute.

13. The system of claim 11, wherein the node-survival module is further programmed to:
prevent at least one node that lacks the common attribute from contacting the coordination point;
prevent at least one node that lacks the common attribute from contacting the coordination point until completion of a pre-defined delay period.

14. The system of claim 10, wherein the node-survival module ensures that only those nodes that share the common attribute survive subsequent to the network-partition event by:
allowing those nodes that share the common attribute to perform tasks on behalf of the plurality of computer clusters;
preventing nodes that lack the common attribute from performing tasks on behalf of the plurality of computer clusters.

15. The system of claim 10, wherein the network-partition event comprises at least one communication failure that prevents sub-clusters within each of the plurality of computer clusters from communicating with one another.

16. The system of claim 15, wherein the communication failure is caused by at least one of:
a node failure;
a communication-infrastructure failure.

17. The system of claim 10, wherein each of the plurality of computer clusters comprises at least one of:
a plurality of virtual machines that are programmed to execute on at least one physical machine;
a plurality of physical machines.

18. The system of claim 10, wherein the common attribute comprises at least one of:
a physical location of the nodes;
a virtual location of the nodes;
at least one application hosted by the nodes.

19. A computer-readable storage medium comprising one or more computer-executable instructions that, when executed by at least one processor of a computing device, cause the computing device to:
identify a multi-cluster computing system comprising a plurality of computer clusters, each of the plurality of computer clusters within the multi-cluster computing system comprising a plurality of nodes;
identify a network-partition event that partitions each of the plurality of computer clusters within the multi-cluster computing system into multiple sub-clusters;
identify, within the multiple sub-clusters of the plurality of computer clusters, a plurality of nodes that share a common attribute;
ensure that only those nodes that share the common attribute survive subsequent to the network-partition event.

20. The computer-readable storage medium of claim 19, wherein the one or more computer-executable instructions, when executed by the processor of the computing device, further cause the computing device to:
allow those nodes that share the common attribute to perform tasks on behalf of the plurality of computer clusters;
prevent nodes that lack the common attribute from performing tasks on behalf of the plurality of computer clusters.

* * * * *